United States Patent
Sandner et al.

(10) Patent No.: US 9,755,423 B2
(45) Date of Patent: Sep. 5, 2017

(54) OVERVOLTAGE PROTECTION FOR A SYNCHRONOUS POWER RECTIFIER

(71) Applicant: Infineon Technologies AG, Neubiberg (DE)

(72) Inventors: Christoph Sandner, Villach (AT); Matteo Agostinelli, Villach (AT)

(73) Assignee: Infineon Technologies AG, Neubiberg (DE)

( * ) Notice: Subject to any disclaimer, the term of this patent is extended or adjusted under 35 U.S.C. 154(b) by 469 days.

(21) Appl. No.: 14/208,502

(22) Filed: Mar. 13, 2014

(65) Prior Publication Data
US 2015/0263511 A1 Sep. 17, 2015

(51) Int. Cl.
H02H 7/125 (2006.01)
H02M 7/219 (2006.01)

(52) U.S. Cl.
CPC .......... *H02H 7/1252* (2013.01); *H02M 7/219* (2013.01)

(58) Field of Classification Search
CPC .............................. H02H 7/1252; H02M 7/219
USPC ............................................................ 363/53
See application file for complete search history.

(56) References Cited

U.S. PATENT DOCUMENTS

| 7,269,038 | B2 | 9/2007 | Shekhawat et al. | |
|---|---|---|---|---|
| 8,634,218 | B2 | 1/2014 | Kung | |
| 9,071,159 | B2 | 6/2015 | Sekimoto | |
| 2007/0058402 | A1* | 3/2007 | Shekhawat | H02M 1/42 363/89 |
| 2011/0080761 | A1* | 4/2011 | Kung | H02M 7/219 363/127 |
| 2012/0281446 | A1 | 11/2012 | Magini et al. | |
| 2014/0002049 | A1* | 1/2014 | Schrom | H02M 1/08 323/311 |
| 2014/0160820 | A1* | 6/2014 | McKinley | H01F 29/025 363/126 |

(Continued)

FOREIGN PATENT DOCUMENTS

CN 101056068 A 10/2007
CN 101860187 A 10/2010
(Continued)

OTHER PUBLICATIONS

Boecker, "Power electronics," Paderborn University, Department for power electronics and electrical drive engineering, Lecture Notes, Aug. 16, 2010, 348 pp. (English translation provided).
(Continued)

*Primary Examiner* — Adolf Berhane
*Assistant Examiner* — Afework Demisse
(74) *Attorney, Agent, or Firm* — Shumaker & Sieffert, P.A.

(57) ABSTRACT

A circuit is described that includes a rectifier configured to rectify a DC output from an AC input, a sensing unit configured to detect a voltage level of the DC output, and a control unit configured to control the rectifier based on the voltage level of the DC output. The control unit is configured to control the rectifier output by at least controlling the rectifier to rectify the DC output from the AC input if the voltage level of the DC output does not indicate an overvoltage condition at the circuit. In addition, the control unit is configured to control the rectifier based on the voltage level of the DC output by at least controlling the rectifier to shunt current from the AC input if the voltage level of the DC output does indicate the overvoltage condition.

20 Claims, 11 Drawing Sheets

(56) References Cited

U.S. PATENT DOCUMENTS

2014/0254203 A1* 9/2014 Dai .................. H02M 3/3353
363/17

FOREIGN PATENT DOCUMENTS

| CN | 102035412 A | 4/2011 |
|---|---|---|
| CN | 102474197 A | 5/2012 |
| CN | 102668364 A | 9/2012 |
| DE | 102009046955 A1 | 5/2011 |
| DE | 102013217896 A1 | 3/2015 |

OTHER PUBLICATIONS

"Highly Integrated Wireless Receiver Qi (WPC V1.1) Compliant Power Supply," Texas Instruments Incorporated, Product Data Sheet bq51013B, SLUSB62A, Mar. 2013—Revised Oct. 2013, 43 pp.

"Industry's First Multi-Mode WPC Compliant Wireless Power Receiver IC," Integrated Device Technology, Inc., Preliminary Datasheet, IDTP9020, Rev. 0.2, Feb. 15, 2013, 30 pp.

"System Description, Wireless Power Transfer, vol. I: Low Power, Part 1: Interface Definition," Wireless Power Consortium, Version 1.1.2, Jun. 2013, 186 pp.

Office Action, in the Chinese language, from counterpart Chinese Application No. 201510109117.8, dated Jan. 18, 2017, 15 pp.

* cited by examiner

OVERVOLTAGE PROTECTION FOR A SYNCHRONOUS POWER RECTIFIER

TECHNICAL FIELD

This disclosure relates to techniques and circuits related to synchronous power rectifiers.

BACKGROUND

Some power applications include one or more rectifiers to convert AC voltages to DC voltages. For instance, a wireless power receiver may rely on a rectifier to convert an AC voltage input received at a receiving coil into a DC voltage that is relied on by some other part of the wireless power receiver (e.g., a power converter, a load, etc.). A rectifier may be a passive rectifier or a synchronous rectifier (otherwise referred to as "active rectifier"). A passive rectifier may include passive elements (e.g., diodes) and a synchronous rectifier may include active elements (e.g., controllable switches). In either case, the elements of a passive and synchronous rectifier are arranged in a particular configuration (e.g., a half-bridge, an H-bridge configuration) to convert an AC voltage to DC. By using active type elements rather than passive type elements, a synchronous rectifier may have a reduced amount of power loss as compared to a passive rectifier.

In some examples, the active type elements of a synchronous rectifier may be Metal Oxide Semiconductor (MOS) type switches and that each include a parasitic body diode. A body diode of each MOS type switch may act like a passive type element of a passive rectifier. Accordingly, even when each MOS type switch of a synchronous rectifier is operating in a switched-off state, the synchronous rectifier may still perform passive rectification. Accordingly, if a large AC voltage is applied to the input of a synchronous rectifier when the MOS type switches are turned-off, the synchronous rectifier may still output a large DC voltage (e.g., a DC voltage that exceeds the breakthrough voltage of the MOS type switches) that can destroy or at least damage the synchronous rectifier and/or surrounding system.

SUMMARY

In general, circuits and techniques of this disclosure may provide protection to a synchronous rectifier from overvoltage conditions without the use of voltage clamps (e.g., high-voltage capacitors at the input to the rectifier) or other types of external components. Through control of the switches of a rectifier, the controller may cause the rectifier to output a rectified DC voltage based on an AC voltage input. However, rather than simply control the switches of the synchronous rectifier to perform rectification, the controller described herein may further control the switches to prevent overvoltage conditions from damaging the rectifier. For example, based on the voltage level of the DC output of the rectifier, the controller may determine whether to adjust the operational state of any of the switches of the rectifier to cause the rectifier to begin operating in a protection mode, thereby resulting in a reduction of the voltage level of the DC output.

In one example, the disclosure is directed to a circuit that includes a rectifier configured to rectify a DC output from an AC input and a sensing unit configured to detect a voltage level of the DC output. The circuit further comprises a control unit configured to control the rectifier based on the voltage level of the DC output by at least controlling the rectifier to: rectify the DC output from the AC input if the voltage level of the DC output does not indicate an overvoltage condition at the circuit; and shunt current from the AC input if the voltage level of the DC output does indicate the overvoltage condition.

In another example, the disclosure is directed to a method that includes detecting a voltage level of a DC output from a rectifier that receives an AC input; determining, by a control unit, whether the voltage level indicates an overvoltage condition at the rectifier; and rectifying, with the rectifier, the DC output if the voltage level of the DC output does not indicate the overvoltage condition. The method further includes shunting current from the AC input, with the rectifier, if the voltage level of the DC output does indicate the overvoltage condition.

In another example, the disclosure is directed to a circuit having means for detecting a voltage level of a DC output from a rectifier that receives an AC input, means for determining whether the voltage level indicates an overvoltage condition at the rectifier, and means for rectifying the DC output if the voltage level of the DC output does not indicate the overvoltage condition. The circuit has further means for shunting current from the AC input if the voltage level of the DC output does indicate the overvoltage condition.

The details of one or more examples are set forth in the accompanying drawings and the description below. Other features, objects, and advantages of the disclosure will be apparent from the description and drawings, and from the claims.

DETAILED DESCRIPTION

Figure 1:
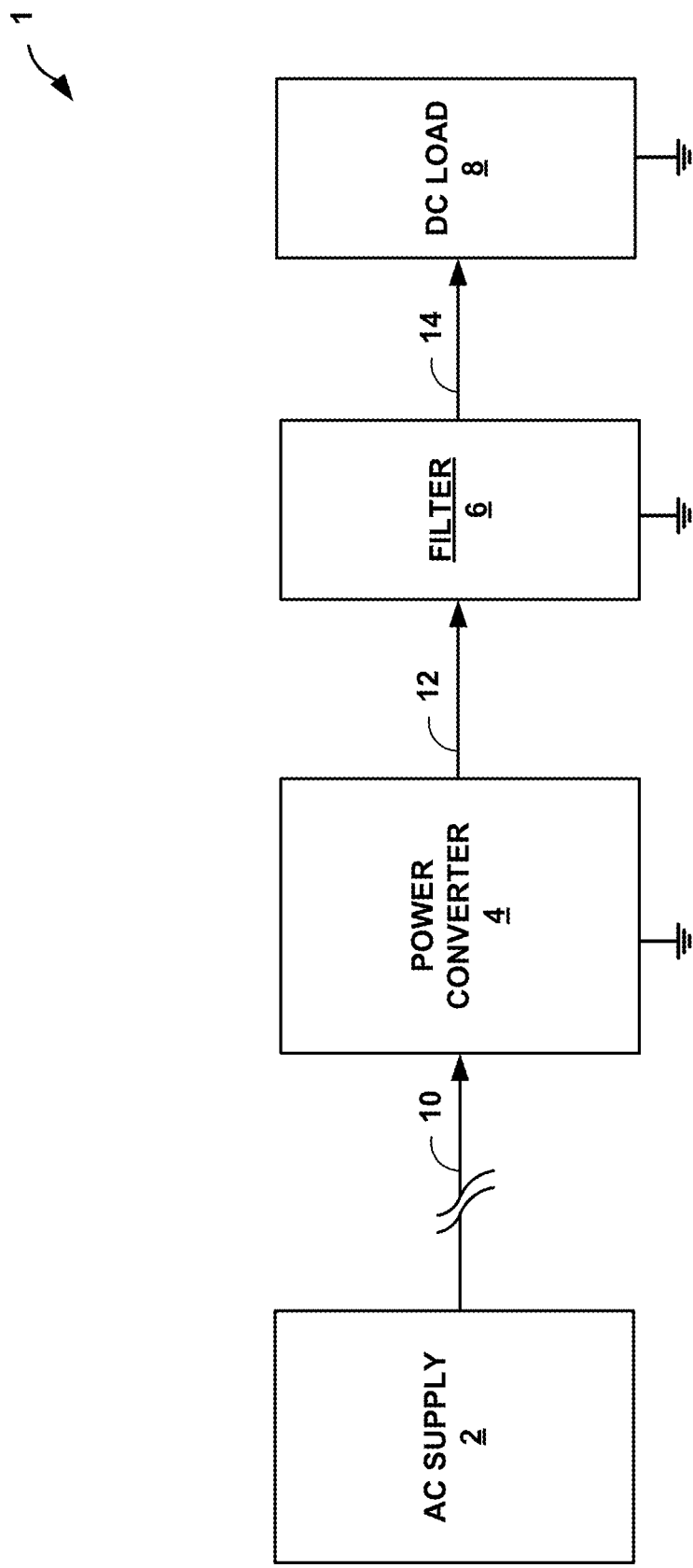
FIG. 1 is a block diagram illustrating an example system for rectifying an AC voltage from an AC supply, in accordance with one or more aspects of the present disclosure.

Some power applications include one or more rectifiers to convert AC voltages to DC voltages. For instance, a wireless power receiver may rely on a rectifier to convert an AC voltage input received at a receiving coil into a DC voltage that is relied on by some other part of the wireless power receiver (e.g., a step-up or step-down converter, a load, etc.). A rectifier may be a passive rectifier or a synchronous rectifier (otherwise referred to as "active rectifier") active rectifier. A passive rectifier may include passive elements (e.g., diodes) and a synchronous rectifier may include active elements (e.g., controllable switches). In either case, the elements of a passive and synchronous rectifier are arranged in a particular configuration (e.g., a half-bridge, an H-bridge configuration) to convert an AC voltage to DC. By using active type elements rather than passive type elements, a synchronous rectifier may have a reduced amount of power loss as compared to a passive rectifier.

In some examples, the active type elements of a synchronous rectifier may comprise Metal Oxide Semiconductor (MOS) type switches and that each include a parasitic body diode. A body diode of each MOS type switch may act like a passive type element of a passive rectifier. Accordingly, even when each MOS type switch of a synchronous rectifier is operating in a switched-off state, the synchronous rectifier may still perform passive rectification.

Referring back to the example wireless power receiver described above, a receiving coil may be exposed to potential signals traveling through the air. If the rectifier of the wireless power receiver is a synchronous rectifier that relies on MOS type switches, any signal that the receiving coil captures, even when the synchronous rectifier is switched-off, has the potential to be rectified. For example, if the receiving coil receives a large AC voltage when the synchronous rectifier is switched-off, a large, unintended DC voltage may be rectified at the output of the synchronous rectifier. An unintended DC voltage at the output of the rectifier, especially if the DC voltage exceeds the breakthrough voltage of the MOS type switches, can destroy or at least damage the synchronous rectifier and/or portion of wireless power receiver that is coupled to the output of the synchronous rectifier.

To prevent a synchronous rectifier from producing unintended DC voltage outputs when such a synchronous rectifier is switched-off, some wireless power receivers and other types of power applications may rely on voltage clamps to block the unintended AC voltage from reaching the synchronous rectifier. For example, a voltage clamp in this context may take the form of a high-voltage capacitor that is coupled to ground and in series with a switch and a respective input terminal of the synchronous rectifier. Each input terminal to the synchronous rectifier may have one or more voltage clamps. When a controller causes the MOS type switches of the synchronous rectifier to switch-off and/or when the controller senses an overvoltage at the output of the synchronous rectifier, the controller also causes the respective switch of each voltage clamp to close, in essence, grounding the input terminals to the synchronous rectifier. By activating each voltage clamp, any potential current that could otherwise enter or has otherwise entered the synchronous rectifier is shunted away from the input terminals and to each grounded capacitor. Drawbacks to voltage clamps such as these are that additional pins, switches, components, etc. are required for their implementation. The additional components and connections may cause an increase in size, area, cost, and/or complexity of the overall system. High voltage capacitors of the type used in such a voltage clamp may be designed to withstand abnormally high voltages and currents. These high voltage capacitors can be particularly cost prohibitive for some applications.

In general, circuits and techniques of this disclosure may provide protection to a synchronous rectifier from overvoltage conditions without the use of voltage clamps (e.g., high-voltage capacitors at the input to the rectifier) or other types of external components. A controller may generally control the operation of the switches of the synchronous rectifier, for example, by providing signals to the rectifier that cause one or more of the switches to transition between operating in an on-state and an off state). Through control of the switches, the controller may cause the rectifier to output a rectified DC voltage based on an AC voltage input.

Rather than merely controlling the switches of a synchronous rectifier to perform rectification, a controller according to the circuits and techniques of this disclosure may further control the switches of the rectifier in such a way as to prevent an overvoltage condition at the rectifier from causing damage to the rectifier. The controller may determine the voltage level at the output of the rectifier and based on the output voltage level, determine whether to adjust the operational state of any of the switches. In the event that the controller determines that an overvoltage is occurring or is about to occur at the rectifier, the controller may cause the rectifier to begin operating in a protection mode. During the protection mode, the rectifier is configured to shunt current away from the AC input of the rectifier to reduce the voltage level of the DC output of the rectifier.

For example, the controller may compare the voltage level at the output to a threshold for determining whether an overvoltage (e.g., a voltage that if present at the rectifier could damage the rectifier) condition may be present. If based on the comparison, the controller determines that the rectified voltage level at the output is nearing the voltage level associated with an overvoltage condition, the controller may partially or completely disable one or more of the switches of the rectifier (e.g., one or more of the high-side switches) and may partially or completely enable one or more of the other switches of the rectifier (e.g., one or more of the low-side switches) to reduce the rectified voltage level back down to tolerable levels.

By relying on a rectified output voltage in controlling the operational state of the switches of a synchronous rectifier, the controller can prevent the rectifier from overvoltage conditions that would otherwise damage the rectifier. In this way, a rectifier can have protection from overvoltage conditions without the use of expensive external components. A power converter that controls a synchronous rectifier according to the circuits and techniques of this disclosure may be less expensive and or smaller in size than some other power converters that rely on external protection components, such as high-voltage capacitors.

FIG. 1 is a block diagram illustrating an example system for rectifying an AC voltage from an AC supply, in accordance with one or more aspects of the present disclosure. FIG. 1 shows system 1 as having four separate and distinct components shown as AC supply 2, power converter 4, filter 6, and DC DC load 8, however system 1 may include additional or fewer components. For instance, AC supply 2, power converter 4, filter 6, and DC DC load 8 may be four individual components or may represent a combination of one or more components that provide the functionality of system 1 as described herein.

System 1 includes AC supply 2 which provides AC electrical power (to system 1. Numerous examples of AC supply 2 exist and may include, but are not limited to, power grids, generators, transformers or any other form of devices that are capable of providing AC power to system 1. AC supply 2 may provide an AC voltage and/or AC current across link 10 to power converter 4.

Power converter 4 represents an AC-to-DC power converter which converts the AC power provided by AC supply 2 into DC power for powering DC load 8. Power converter 4 includes one or more receiving coils, rectifiers, step-up or step-down converters, filters, and/or other components to convert the voltage and/or current associated with the power received from AC supply 2 into a usable form of DC power for use by DC load 8. For example, power converter 4 may be a wireless power receiver that converts wireless AC energy into a DC voltage output. In some examples, power converter 4 includes a control unit to control the operation of power converter 4. For instance, the control unit of power converter 4 may control when and at what magnitude power converter 4 outputs a DC voltage at link 12.

Filter 6 and DC load 8 represent optional components of system 1. DC load 8 may receive the DC power (e.g., voltage, current, etc.) converted by power converter 4 after the DC power passes through filter 6. In some examples, DC load 8 uses the filtered DC power from power converter 4 and filter 6 to perform a function. Numerous examples of filter 6 exist and may include, any suitable electronic filter for filtering power for a load. Examples of filter 6 include, but are not limited to, passive or active electronic filters, analog or digital filters, high-pass, low-pass, band pass, notch, or all-pass filters, resistor-capacitor filters, inductor-capacitor filters, resistor-inductor-capacitor filters, and the like. Likewise, numerous examples of DC load 8 exist and may include, but are not limited to, charging circuits, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

AC supply 2 may provide AC power (e.g., power which has an AC voltage level or AC current level) over link 10. DC load 8 may receive DC power (e.g., power which has a DC voltage level or DC current level) converted by power converter 4, and filtered through filter 6, over link 14. Links 10, 12, and 14 represent any medium capable of conducting electrical power from one location to another.

Examples of links 10, 12, and 14 include, but are not limited to, physical and/or wireless electrical transmission mediums such as electrical wires, electrical traces, conductive gas tubes, twisted wire pairs, and the like. Each of links 10 and 12 may provide electrical coupling between, respectively, AC supply 2 and power converter 4, and power converter 4 and filter 6. Link 14 provides electrical coupling between filter 6 and DC load 8. In addition, link 14 provides a feedback loop or circuit for carrying information to power converter 4 associated with the characteristics of a filtered power output from filter 6. In the example of FIG. 1, link 10 is a wireless link for wirelessly transmitting AC power, however in other examples, link 10 may be a wired or physical link.

In the example of system 1, power converter 4 may rectify the AC voltage of the AC power delivered by AC supply 2 to a DC voltage of DC power that meets the power requirements of DC load 8. For instance, AC supply 2 may output, and power converter 4 may receive, power which has an AC voltage level at link 10. Power converter 4 may convert (e.g., rectify) the power which has the AC voltage level to power which has a DC voltage level that is required by DC load 8. Power converter 4 may output the power that has the DC voltage level at link 12. Filter 6 may receive the power from converter 4 and output the filtered power that has the DC voltage level at link 14. DC load 8 may receive the filtered power that has the DC voltage level at link 14. DC load 8 may use the filtered power having the DC voltage level to perform a function (e.g., power a microprocessor).

Figure 2:
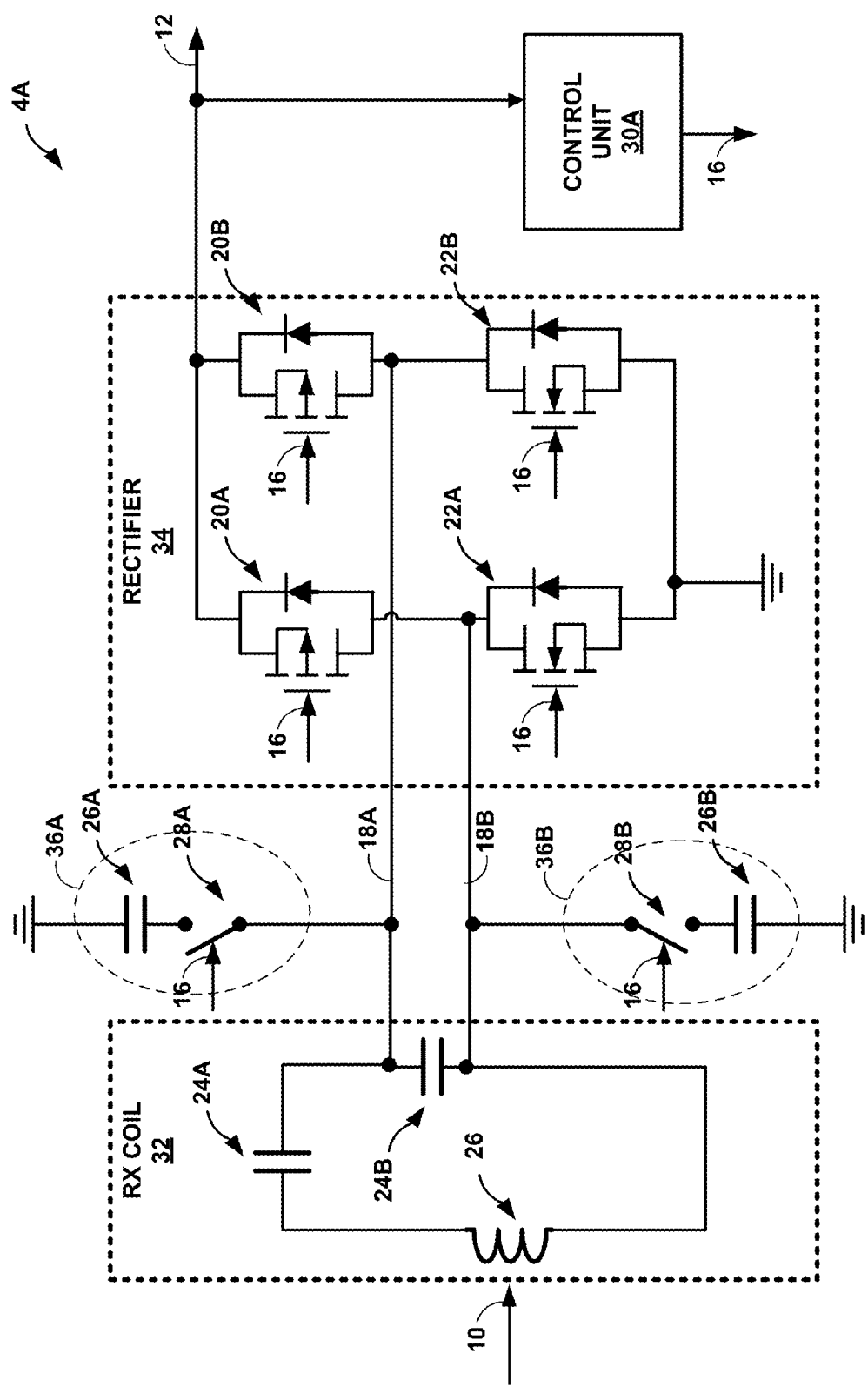
FIG. 2 is a block diagram illustrating one example of the power converter of the example system shown in FIG. 1 which uses voltage clamps for overvoltage protection.

FIG. 2 is a block diagram illustrating one example of power converter 4 of system 1 shown in FIG. 1 which uses voltage clamps for overvoltage protection. For instance, FIG. 2 shows power converter 4A as a more detailed exemplary view of power converter 4 of system 1 from FIG. 1 and the electrical connections to AC supply 2, filter 6, and DC load 8, provided by links 10, 12, and 14 respectively. As described below, power converter 4A uses voltage clamps 36A and 36B for overvoltage protection.

Power converter 4A is shown as being a wireless power receiver configured to receive an AC power input via wireless link 10 and output DC power via link 12. Power converter 4A includes receiving ("RX") coil 32 coupled to synchronous rectifier 34 (referred to simply as "rectifier 34").

RX coil 32 includes inductor 26 and capacitors 24A and 24B. RX coil may receive an AC power input via wireless link 10 and output an AC current and/or AC voltage associated with the AC power input at nodes 18A and 18B (e.g., the cathode terminal and anode terminal of capacitor 24B). Rectifier 34 may receive the AC current and/or AC voltage from RX coil 32 at nodes 18A and 18B and rectify the AC current and/or AC voltage to a rectified DC current and/or rectified DC voltage output at link 12.

Rectifier 34 includes high-side switches 20A and 20B (collectively referred to herein as "switches 20") and low-side switches 22A and 22B (collectively referred to herein as "switches 22"). Switches 20 and 22 represent MOS type switch devices that are arranged in a H-bridge configuration for rectifying an AC voltage input received at nodes 18A and 18B into a DC voltage output at link 12. In some examples, switches 20 and 22 of rectifier 34 may include additional and/or fewer switches. In addition, other configurations of switches 20 and 22 may exist including half-bridge configurations and the like.

Switches 20 and 22 may each receive a respective control signal via one of links 16 that causes the respective switch to transition between operating in an on-state and an-off state. As used herein, the term "on-state" reflects an operating state of each of switches 20 and 22 that corresponds to the switch being "switched-on," "turned-on," "closed," and/or "enabled." The term "off-state" reflects an operating state of each of switches 20 and 22 that corresponds to the switch being "switched-off," "turned-off," "opened," and/or "disabled." The operating state of each of switches 20 and 22 may depend at any particular time on the respective signal being received over link 16.

Power converter 4A includes control unit 30A for controlling rectifier 34 to rectify a DC voltage output at link 12. In other words, control unit 30A represents a combination of driver/control logic of power converter 4A for performing rectification techniques to control switches 20 and 22 to produce a rectified DC voltage at link 12. Control unit 30A may issue control signals via links 16 that cause one or more of switches 20 and 22 transition between operating in an on-state and an-off state. For example, control unit 30A may issue control signal via link 16 that cause switches 20A and 22B to switch-on and switches 20B and 22A to switch-off. Control unit 30A may issue a subsequent control signal via link 16 that causes switches 20A and 22B to switch-off and switches 20B and 22A to switch-on. Control unit 30A can issue commands or signals via links 16 that cause switches 20 and 22 to transition between operating in respective on-states and/or off-states in various patterns and at various times in order to cause rectifier 34 to produce a rectified voltage output at link 12.

To protect power converter 4A from overvoltage conditions, power converter 4A relies on active voltage clamps 36A and 36B coupled to nodes 18A and 18B (e.g., the input to rectifier 34). Voltage clamp 36A includes switch 28A that when closed, couples grounded high-voltage capacitor 26A to node 18A. Closing switch 28A "enables" voltage clamp 36A for providing overvoltage protection for rectifier 34. Voltage clamp 36B includes switch 28B that when enabled, couples grounded high-voltage capacitor 26B to node 18B. Closing switch 28B "enables" voltage clamp 36B for providing overvoltage protection for rectifier 34. Control unit 30A may issue one or more commands or signals via links 16 to enable voltage clamps 36A and 36B.

The control unit 30A may enable voltage clamps 36A and 36B when control unit 30A detects an overvoltage condition at the output of power converter 4A (e.g., at link 12). For example, control unit 30A may detect a current and/or voltage condition at link 12 and determine that the voltage may be exceeding the operating limits of rectifier 34. To prevent rectifier 34 from being damaged from the overvoltage at the input of rectifier 34, control unit 30A may generate one or more commands or signals at links 16 that enable voltage clamps 36A and 36B. In this way, charge (e.g., current) at the input to rectifier 34 from RX coil 36 is shunted away from rectifier 34 during the overvoltage. When control unit 30A determines that the overvoltage condition is over, control unit 30A may disable voltage clamps 36A and 36B to allow rectifier 34 to again receive current from RX coil.

There are numerous drawbacks to power converter 4A and the use of voltage clamps, such as voltage clamps 36A and 36B for overvoltage protection. For example, each of voltage clamps 36A and 26B represent additional external components beyond RX coil 32, rectifier 34, and control unit 30A and therefore may increase the overall size, area, and/or complexity of power converter 4A. Furthermore, each of voltage clamps 36A and 26B represent potentially costly (e.g., expensive) components. For instance, capacitors 26A and 26B may be expensive high-voltage capacitors which are rated to withstand a high voltage and/or high current. The use of potentially expensive voltage clamps 36A and 36B may therefore increase overall cost of power converter 4A.

Figure 3:
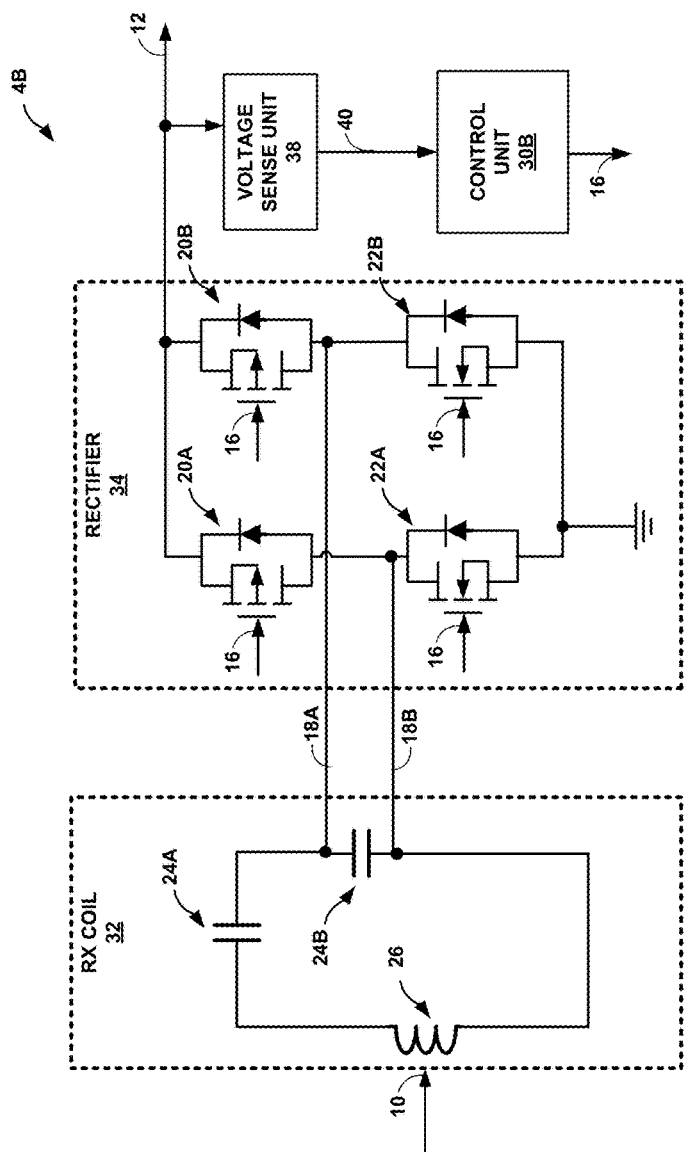
FIG. 3 is a block diagram illustrating one example of the power converter of the example system shown in FIG. 1 which has overvoltage protection in accordance with one or more aspects of the present disclosure.

FIG. 3 is a block diagram illustrating one example of power converter 4 of system 1 shown in FIG. 1 which has overvoltage protection in accordance with one or more aspects of the present disclosure. For instance, FIG. 2 shows power converter 4B as a more detailed exemplary view of power converter 4 of system 1 from FIG. 1 and the electrical connections to AC supply 2, filter 6, and DC load 8, provided by links 10, 12, and 14 respectively. As described below, power converter 4B offers various advantages over power converter 4A. For example, rather than rely on additional, and potentially expensive voltage clamps, such as voltage clamps 36A and 36B, power converter 4B may perform overvoltage protection through careful control of switches 20 and 22 of rectifier 34.

Power converter 4B includes RX coil 32 coupled directly to rectifier 34 without the use of any voltage clamps at the input to rectifier 34. Power converter 4B further includes control unit 30B in addition to voltage sense unit 38.

Rectifier 34 includes four switches 20 and 22 (shown as MOS type switches) arranged in an H-bridge configuration. In some examples, rectifier 34 may include fewer than four switches or more than four switches. For example, switches 20 and 22 may be only two switches arranged in a half-bridge configuration or any other arrangement of more than four switches that can be used by rectifier 34 to produce a rectified voltage output at link 12.

In the example of FIG. 3, each of switches 20 and 22 of rectifier 34 are active switching elements capable of conducting current in a passive mode. For instance, each of switches 20 and 22 represent MOS type switches that each include respective body diodes configured to conduct current, even when switched-off, when the voltage across each of switches 20 and 22 exceeds the breakthrough voltage of each respective body diode. In some examples, high-side switches 20 may not be active switching elements and may instead be passive switching elements, such as diodes. Any active switching elements of rectifier 34, whether just low-side switches 22 or both low-side switches 22 and high-side switches 20, have body diodes (e.g., to also act as passive rectifier in case of turned-off switches, as is the case with MOS transistors). In some examples, high-side switches 20 may be either NMOS (with bootstrap driver) or PMOS switches.

Control unit 30B is used by power converter 4B to control rectifier 34 to rectify a DC voltage output at link 12 based on an AC power input at link 10. In other words, control unit 30B represents a combination of driver/control logic of power converter 4B for performing rectification techniques to control switches 20 and 22 of rectifier 34 to produce a rectified DC voltage at link 12. Control unit 30B may issue control signals via links 16 that cause one or more of switches 20 and 22 transition between operating in an on-state and an-off state. For example, control unit 30B may issue control signal via link 16 that cause switches 20A and 22B to switch-on and switches 20B and 22A to switch-off. Control unit 30B may issue a subsequent control signal via link 16 that causes switches 20A and 22B to switch-off and switches 20B and 22A to switch-on. Control unit 30B can issue commands or signals via links 16 that cause switches 20 and 22 to transition between operating in respective on-states and/or off-states in various patterns and at various times in order to cause rectifier 34 to produce a rectified voltage output at link 12.

Control unit 30B can comprise any suitable arrangement of hardware, software, firmware, or any combination thereof, to perform the techniques attributed to control unit 30B herein. In some examples, control unit 30B includes only digital control logic, only analog control logic, or in some examples, a combination of digital and analog control logic.

For example, control unit 30B may include digital circuitry, analog circuitry, or any combination thereof to control and regulate a switch mode power converter. Control unit 30B may include any one or more microprocessors, signal processors, application specific integrated circuits (ASICs), field programmable gate arrays (FPGAs), comparators, operational amplifiers, full-custom and/or semi-custom digital logic, registers for storing control data (e.g., parameters), analog and/or digital filter stages, non-linear control blocks, or any other equivalent, integrated, digital or analog circuitry, as well as any combinations of such components.

When control unit 30B includes software or firmware, control unit 30B further includes hardware for storing and executing the software or firmware, such as one or more digital or analog processors or processing units. In general, a processing unit may include one or more microprocessors, signal processors, ASICs, FPGAs, comparators, operational amplifiers, or any other equivalent, integrated, digital or analog circuitry, as well as any combinations of such components. Although not shown, control unit 30B may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to control unit 30B and/or power converter 4B, e.g., may be external to a package in which control unit 30A and/or power converter 4B is housed.

Voltage sense unit 38 is coupled to link 12 (e.g., the output of rectifier 34) for determining or measuring a voltage level at link 12 from which controller unit 30B may detect an overvoltage condition. For example, voltage sense unit 38 represents any combination of digital and/or analog circuitry capable of providing information via link 40 that is indicative of the voltage level at link 12. Examples of voltage sense unit 38 are a voltage comparator, an analog to digital converter (ADC), a protection clamp current drain, and the like. Voltage sense unit 38 represents any combination of hardware, software, and/or firmware for detecting a voltage level at the output of rectifier 34.

In accordance with circuits and techniques disclosed herein, control unit 30B may obtain a voltage level of a rectified DC voltage that rectifier 34 outputs at link 12 via a connection that control unit 30B shares with voltage sense unit 38 at link 40. Converter 4B may rely on the voltage level of the rectified DC voltage to determine whether an overvoltage condition at power converter 4B is occurring or is about to occur. If control unit 30B determines, based on the voltage level of the rectified DC voltage, that an overvoltage condition is occurring or is likely to occur, control unit 30B may alter the control pattern of switches 30 and 32 to prevent the overvoltage from damaging rectifier 34. In other words, rather than rely on other types of overvoltage protections (e.g., expensive high-voltage external clamping capacitors, and the like) control unit 30B of power converter 4B can sense the rectified voltage at link 12, determine whether the rectified voltage indicates an overvoltage condition, and in case of an overvoltage condition, control unit 30B may use a modified control mode to configure rectifier 34 such that the rectified voltage level is reduced. In this way, the combination of voltage sense unit 38 and the operations performed by control unit 30B act similar to an active clamp structure at the output of rectifier 34 that senses the rectified voltage and clamps the rectified voltage to levels that the components of rectifier 34 can tolerate.

For example, control unit 30B may receive information from voltage sense unit 38 about the voltage level associated with the rectified voltage output at link 12. Control unit 30B may compare the information to one or more thresholds (e.g., a maximum voltage threshold, such as the break-through voltage associated with switches 20 and 22) for determining whether an overvoltage condition is occurring or is about to occur at rectifier 34. For instance, if the information received from voltage sense unit 38 indicates that the level of the rectified voltage is meets or exceeds the one or more thresholds (e.g., a voltage value within a tolerance of the break through voltage associated with one or more of switches 20 and 22) control unit 30B may determine that an overvoltage condition is occurring at rectifier 34.

If control unit 30B determines that rectifier 34 is experiencing or is about to undergo an overvoltage condition, control unit 30B may alter the control of switches 20 and 22 and control switches 20 and 22 via commands across link 16 to cause rectifier 34 to operate in "protection mode." When control unit 30B causes rectifier 34 to operate in protection mode, control unit 30B may switch-off, turn-off, or otherwise partially or completely disable switches 20A and 20B of rectifier 34 (e.g., each of the high-side switches of rectifier 34) while switching-on, turning-on, or otherwise partially or completely enabling switches 22A and 22B of rectifier 34 (e.g., each of the low-side switches of rectifier 34).

As a result of configuring rectifier 34 to operate in protection mode during an overvoltage event, control unit 30B may cause a low-ohmic connection between nodes 18A and 18B (e.g., the AC inputs of rectifier 34) and a common ground. The low-ohmic connection between nodes 18A and 18B and a common ground may remove or at least limit any stress that switches 20 and 22 may experiencing during an overvoltage and may prevent damage or destruction of rectifier 34.

By relying on a rectified output voltage at link 12 in controlling the operational state of switches 20 and 22, control unit 30B can prevent rectifier 34 from overvoltage conditions that may otherwise damage rectifier 34. In this way, rectifier 34 has protection from overvoltage conditions without the use of expensive external components, such as voltage clamps 26A and 26B used by power converter 4A of FIG. 2. Through control of rectifier 34 according to the circuits and techniques of this disclosure, power converter 4B may be less expensive and or smaller in size than some other power converters that rely on external protection components, such as high-voltage capacitors.

FIGS. 4A-4D are block diagrams illustrating alternative examples of rectifier 34 of the power converter shown in FIG. 3. For example, rectifiers 34A, 34B, 34C, and 34D of FIGS. 4A, 4B, 4C, and 4C each illustrate alternative examples of rectifiers that can be controlled according to the level a rectified voltage output to prevent damage during an overvoltage condition.

The respective inputs to rectifiers 34A, 34B, 34C, and 34D are each coupled to RX coil 32 of power converter 4B at nodes 18A and 18B. The respective outputs of rectifiers 34A, 34B, 34C, and 34D are each coupled to link 12.

Rectifiers 34 illustrate alternative arrangements of active and/or passive switching elements that can be configured by control unit 30B to operate in protection mode described above. In each example of rectifiers 34A, 34B, 34C, and 34D, the low-side switches 22 are capable of operating in active and passive mode via a body diode. The high-side switches may or may not be actively controllable devices. For example, rectifier 34A includes high-side diodes 52A and 52B in a H-bridge configuration with low-side switches 22. Rectifier 34B includes high-side switch 20A and low-side switch 22 in a half-bridge arrangement to provide a rectified voltage output at link 12. Rectifier 34C includes high-side diode 52A coupled to low-side switch 22A to provide a rectified voltage output at link 12.

Rectifier 34D includes high-side diodes 52A and 52B in a H-bridge configuration with low-side switches 22 along with respective switches 54A and 54B arranged in parallel to each of low-side switches 22. In this way, rectifier 34D allows switches 22 to remain active or inactive regardless of whether an overvoltage condition exists at link 12 and controller unit 30B can control switches 54A and 54B via commands over links 16 to shunt current away from the input to rectifier 34D in case of an over voltage condition. Switches 54A and 54B may be smaller or less robust switches than switches 22 and any high-side switches of rectifier 34D. Switches 54A and 54B can be used as shown or in any other arrangement of rectifier, such as rectifiers 34A, 34B, 34C of FIGS. 4A-4C as well as rectifier 34 of FIG. 3.

Figure 4C:
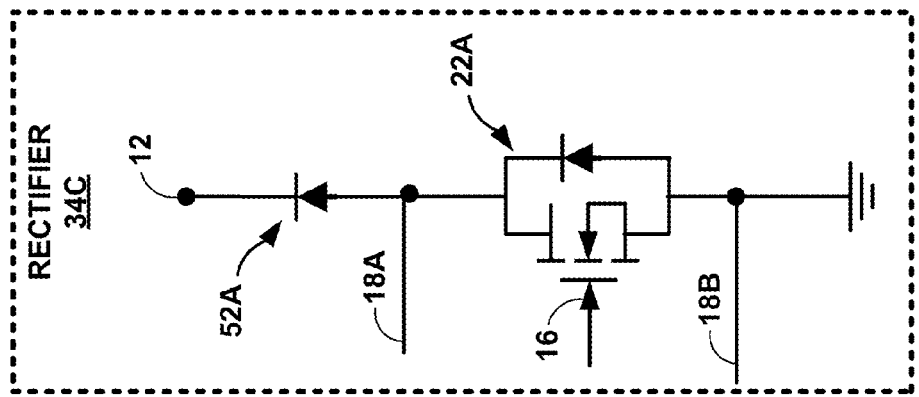
FIGS. 4A-4D are block diagrams illustrating alternative examples of the rectifier of the power converter shown in FIG. 3.
Figure 4B:
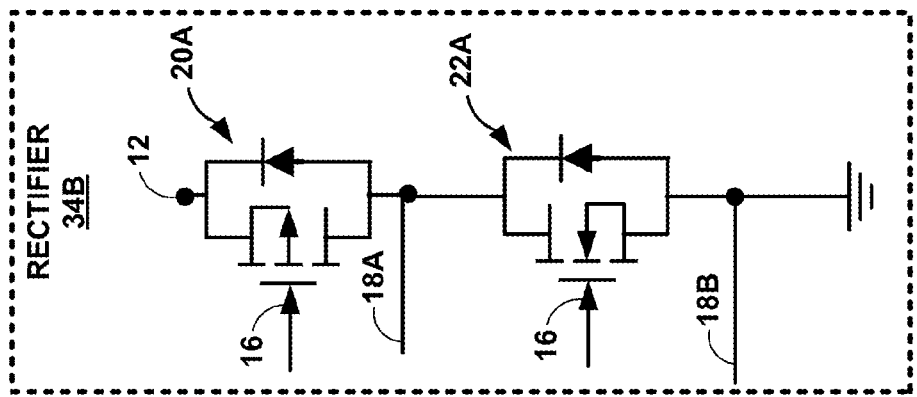
Figure 4A:
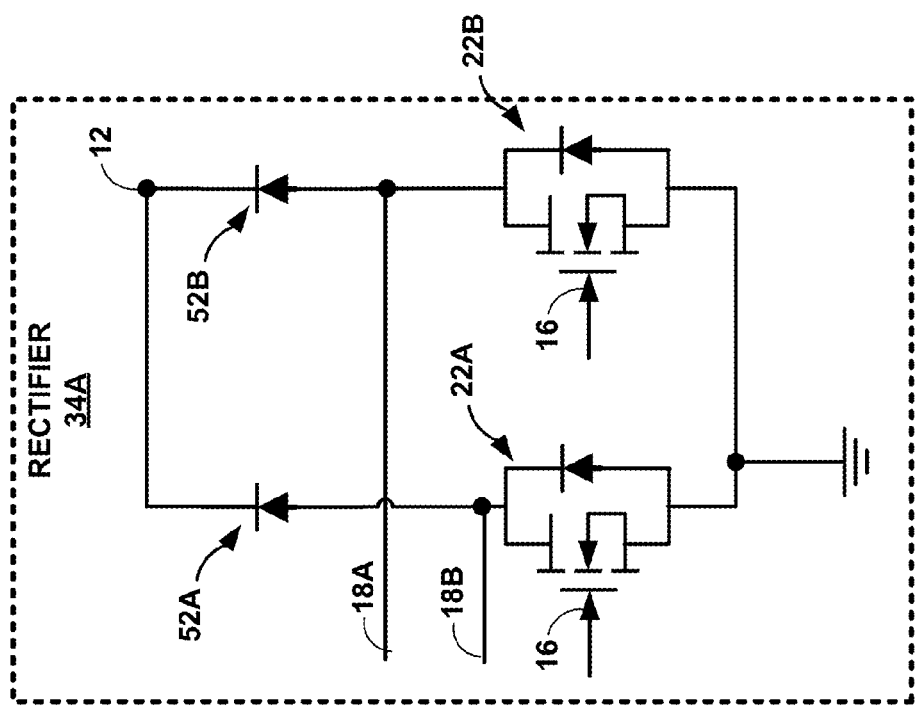
Figure 4D:
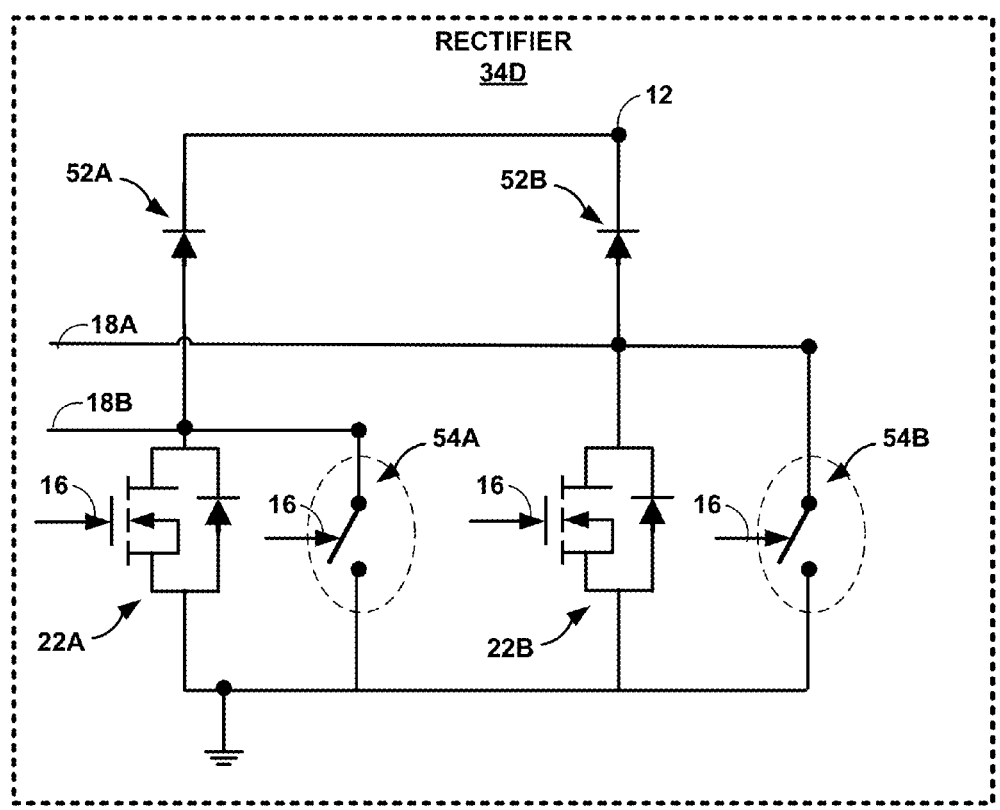

FIGS. 4A-4D illustrate that in some examples, perform overvoltage protection in accordance with the circuits and techniques described herein, rectifier 34A, rectifier 34B, rectifier 34C, and rectifier 34D may each include at least one low-side element that is a MOS transistor type switch (e.g., switch 22A). In some examples, as shown in rectifier 34B of FIG. 4B, at least one high-side element is a MOS transistor type switch (e.g., switch 20A). Still in other examples, as shown in rectifiers 34A and 34C, at least one high-side element is a diode (e.g., diode 52A). FIG. 4A illustrates that in some examples, the at least one low-side element of rectifier 34A and the at least one high-side element of rectifier 34A are arranged in an H-bridge configuration. FIGS. 4B-4C each illustrate that in some examples, the at least one low-side element of rectifiers 34B and 34C and the at least one high-side elements of rectifier 34B and 34C are arranged in a H-bridge configuration. FIG. 4D shows that additional switching elements can be used to shunt current from an input of a rectifier. FIGS. 4A-4D further illustrate that no matter the quantity of switching elements, each of the one or more switching elements that the rectifier uses to rectify the output at link 12 includes a respective body diode.

Figure 5:
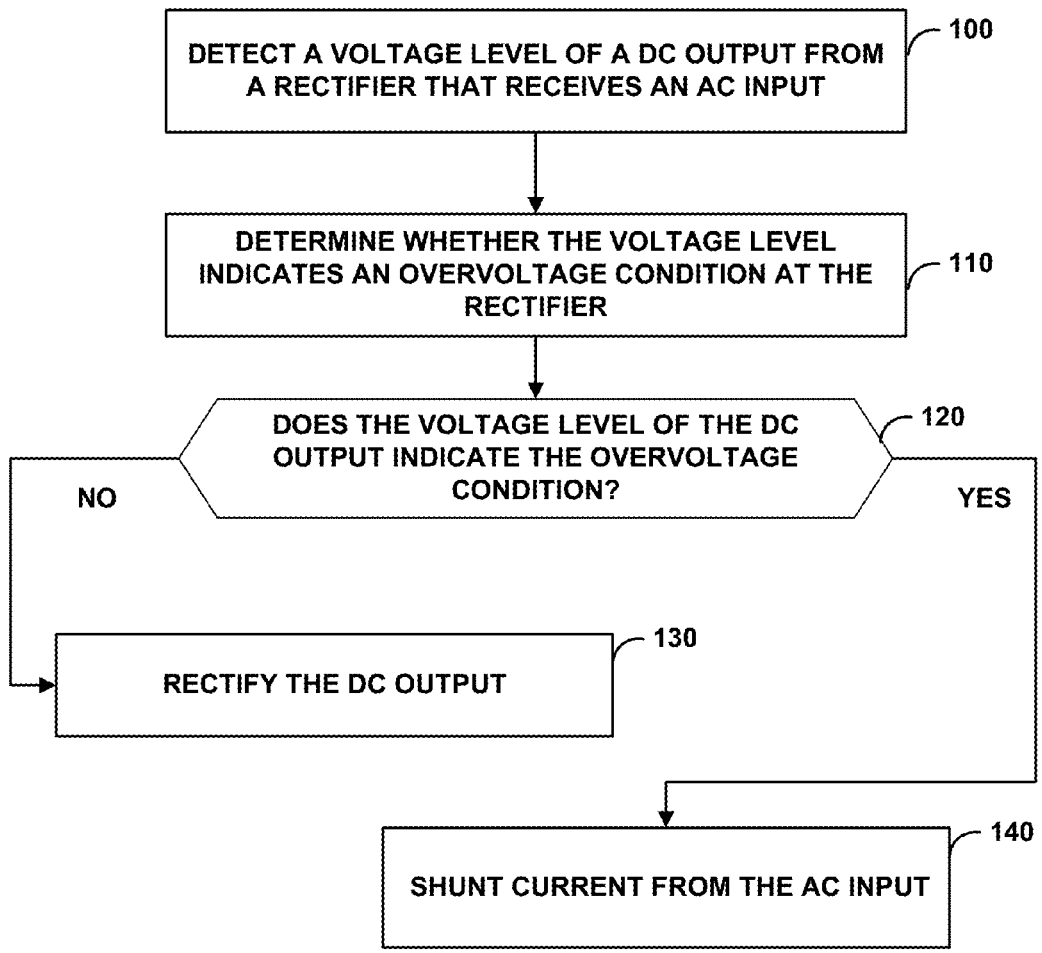
FIG. 5 is a flowchart illustrating example operations of an example power converter which has overvoltage protection in accordance with one or more aspects of the present disclosure.

FIG. 5 is a flowchart illustrating example operations of an example power converter which has overvoltage protection in accordance with one or more aspects of the present disclosure. FIG. 5 is described below within the context of FIG. 3. For example, control unit 30B may perform the operations described below with respect to FIG. 5.

In the example of FIG. 5, a control unit may detect a voltage level of a DC output from a rectifier that receives an AC input (100). For example, control unit 30B of power converter 4B may receive information from voltage sense unit 38 as rectifier 34 outputs a rectified DC voltage at link 12.

In the example of FIG. 5, the control unit may determine whether the voltage level whether the voltage level indicates an overvoltage condition at the rectifier (110). For example, control unit 30B may compare the voltage level of the DC output at link 12 to a threshold or reference voltage received by control unit 30B to determine whether or not the voltage at the output of rectifier 34 is at or reaching levels that could damage rectifier 34. For instance, control unit 30B may compare the voltage level at link 12 to a breakthrough voltage associated with one or more of switches 20 and 22 to assess whether the DC output is at a voltage level that may damage rectifier 34.

In the example of FIG. 5, if the voltage level if the voltage level of the DC output does not indicate the overvoltage condition (120), the control unit may rectify, with the rectifier, the DC output (130). In other words, control unit 30B may rectify the AC input at rectifier 34 or at least not adjust the state of switches 20 and 22 if the level of voltage at the output of rectifier 34 poses no threat to damaging power converter 4B. However, if the voltage level of the DC output does indicate the overvoltage condition (120), the control unit may cause the rectifier to shunt or divert current from the AC input, with the rectifier (140). For example, control unit 30B may provide control commands or signals across links 16 that cause each of high-side switches 20 to open, turn-off, switch-off, or otherwise become disabled, and further cause each of low-side switches 22 to close, turn-on, switch-on, or otherwise become enabled. With each of the low-side switches 22 enabled and each of the high-side switches 20 disabled, the current at the AC input to rectifier 34 may be diverted away from the AC input and to ground. In some examples, control unit 30B may cause rectifier 34 to cease rectifying the DC output at link 12 when causing current to be shunted away from the input to rectifier 34.

In some examples, in case of an overvoltage condition, control unit 30B may first trigger a "smooth" shunting of current at the input of rectifier 34 to towards ground. To perform smooth shunting of current, control unit 30B may fully turn-on or fully enable low-side switches 22 (e.g., to cease rectifying a voltage at link 12). In some examples, control unit 30B may only partially turn-on or turn-on only some of low-side switches 22 to allow rectifier 34 to continue to rectify an output at link 12, but to reduce the voltage level to prevent damage. In some examples, additional smaller switches may be connected in parallel to low-side switches 22 and control unit 30B may close the additional switches while keeping the main rectifier switches 22 active in order to reduce the voltage level at link 12.

In some examples, when enabling the low-side switches of the rectifier during an overvoltage condition, the control unit may enable the low-side switching elements by performing hard switching. For example, control unit 30B may issue one or more commands or signals across links 16 that cause switches 22 to be switched on in such a way as to maximize the amount of current that gets diverted from the AC input to rectifier 34 at a time. In other words, by performing hard switching, control unit 30B may cause switches 22 to switch-on to maximize a rate at which each of low-side switches 33 shunts the current from the AC input.

In some examples, when enabling the low-side switches of the rectifier during an overvoltage condition, the control unit may enable the low-side switching elements by performing soft switching. For example, control unit 30B may issue one or more commands or signals across links 16 that cause switches 22 to be switched on in such a way as to maximize efficiency of rectifier 34 and power converter 4B. In other words, control unit 30B may control low-side switches 22 in such a way as to control a rate at which low-side switches 22 shunt current from the AC input to rectifier 34. Examples of soft switching include zero voltage switching techniques and zero current switching techniques. By performing soft switching, control unit 30B may be controlling the on-resistance $R_{DSON}$ of each of low-side switches 22 to minimize the risk that the overvoltage condition will cause damage to rectifier 34 without inhibiting performance or efficiency of power converter 4B.

Figure 6:
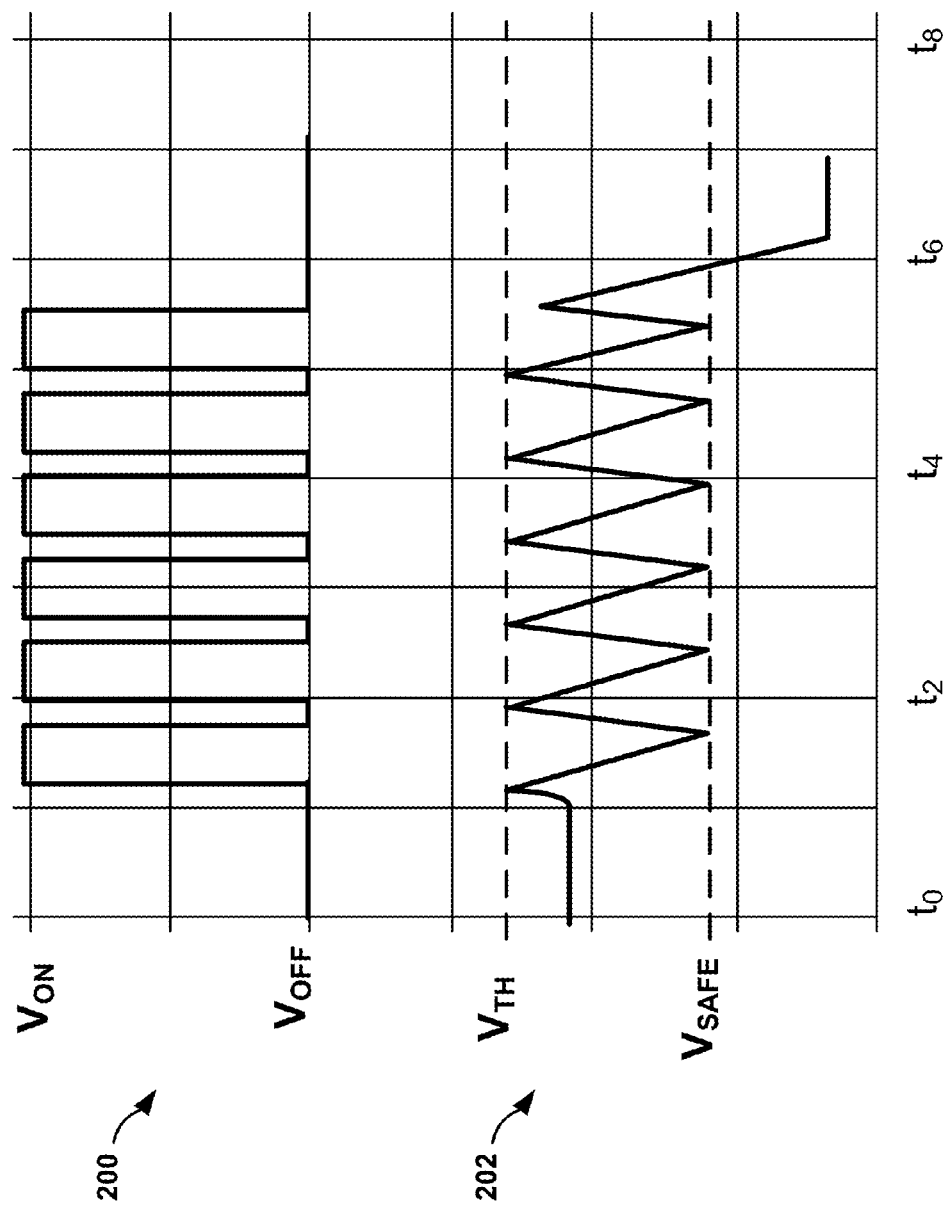
FIG. 6 is a timing diagram illustrating electrical timing characteristics an example power converter which has overvoltage protection in accordance with one or more aspects of the present disclosure.

FIG. 6 is a timing diagram illustrating electrical timing characteristics an example power converter which has overvoltage protection in accordance with one or more aspects of the present disclosure. For example, FIG. 6 shows timing characteristics of power converter 4B. Plot 200 shows the gate voltage being applied to switches 22 by control unit 30B between times t0 and t8. Plot 200 illustrates that when the gate voltage at links 16 coupled to switches 22 reaches the level VON, switches 22 are switched-on, and when the gate voltage at links 16 coupled to switches 22 falls to the level VOFF, switches 22 are switched-off.

Plot 202 shows the rectified voltage level of the DC output of rectifier 34 between times t0 and t8. Plot 202 shows that the threshold voltage $V_{TH}$, control unit gate voltage being applied to switches 22 by control unit 30B between times t0 and t8. Plot 202 shows that when the voltage level at the output of rectifier 34 meets or exceeds the threshold voltage VTH, control unit 30B may cause switches 22 to close, which further causes the voltage level at the output of rectifier 34 to drop.

In some examples, if switches 20 and 22 are 12V devices (e.g., devices with operating limits not to exceed 12V), a voltage picked up by RX coil 32 may easily exceed 20-30V. Control unit 30B may include a comparator that compares the voltage at the output of rectifier 34 to a threshold that corresponds to the operating limit 12V. When the rectified voltage at the output of rectifier 34 exceeds the predefined threshold (e.g. 12V), control unit 30B may cause rectifier 34 to operate in protection mode. In other words, control unit 30B may cause both low-side switches 22 to be activated, switched-on, or otherwise enabled, shunting AC current from nodes 18A and 18B to ground and steering current away from power converter 4B. In addition, control unit 30B may cause high-side switches 20 to be switched-off turned-off, or otherwise disabled. Control unit 30B may cause rectifier 34 to transition out of protection mode when the rectified voltage at the output of rectifier 34 drops below the hysteresis window (e.g., $V_{SAFE}$). Plot 2 shows the rectified output of rectifier 34.

Figure 7:
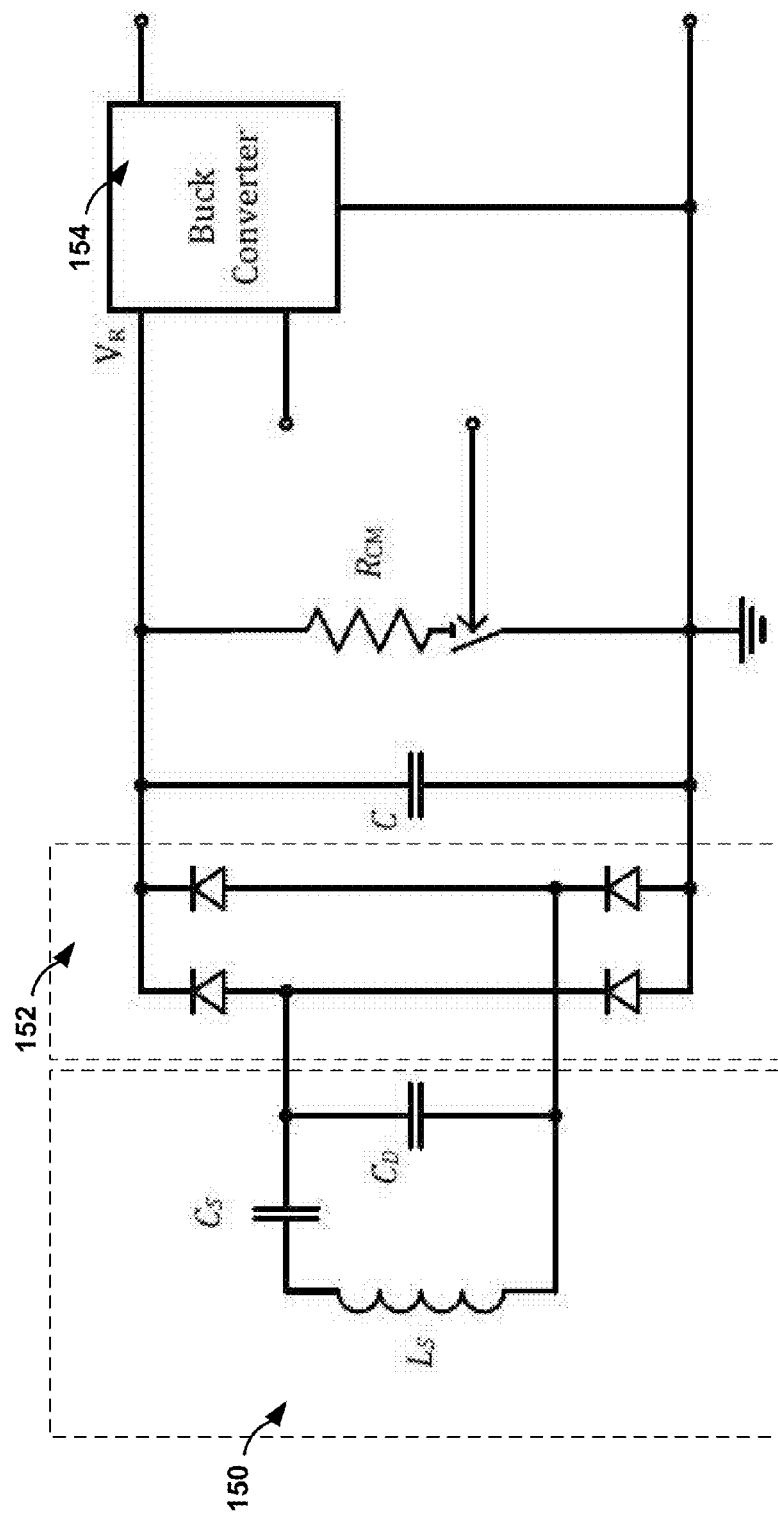
FIG. 7 is a block diagram of an example wireless power receiver with a passive rectifier.

FIG. 7 is a block diagram of an example wireless power receiver with a passive rectifier. The passive rectifier of FIG. 7 may receive an AC input at receiving coil circuit 150 which includes $L_S$, $C_S$, and $C_D$ and convert the AC input using passive rectifier 152 to a rectified DC voltage output at buck converter 154 (e.g., a step-down converter) at $V_R$. Passive rectifier 152 includes four diodes arranged in an H-bridge configuration for performing passive rectification.

Figure 8A:
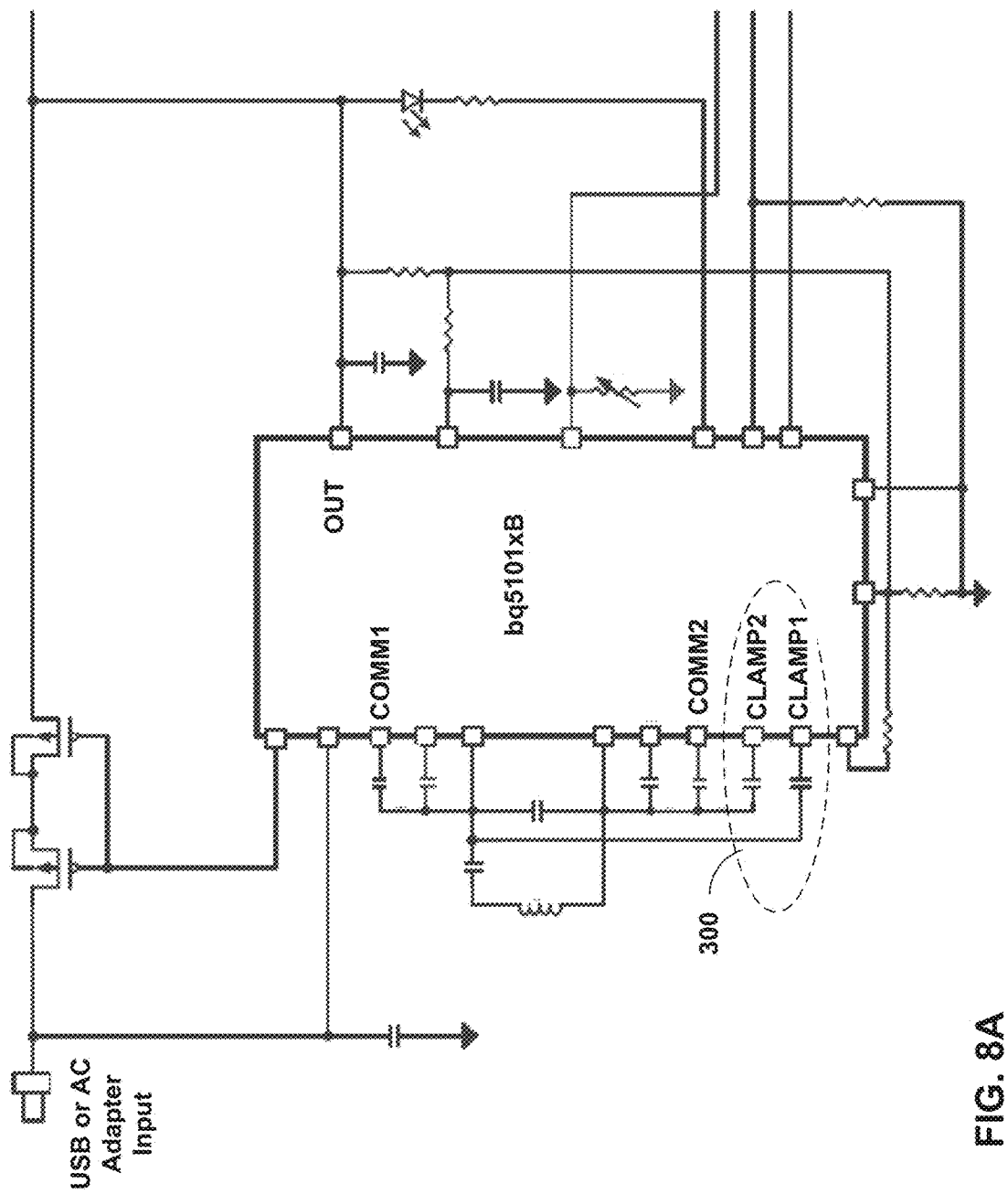
FIGS. 8A and 8B are circuit diagrams of an example wireless power receiver with a synchronous rectifier and voltage clamps for overvoltage protection.
Figure 8B:
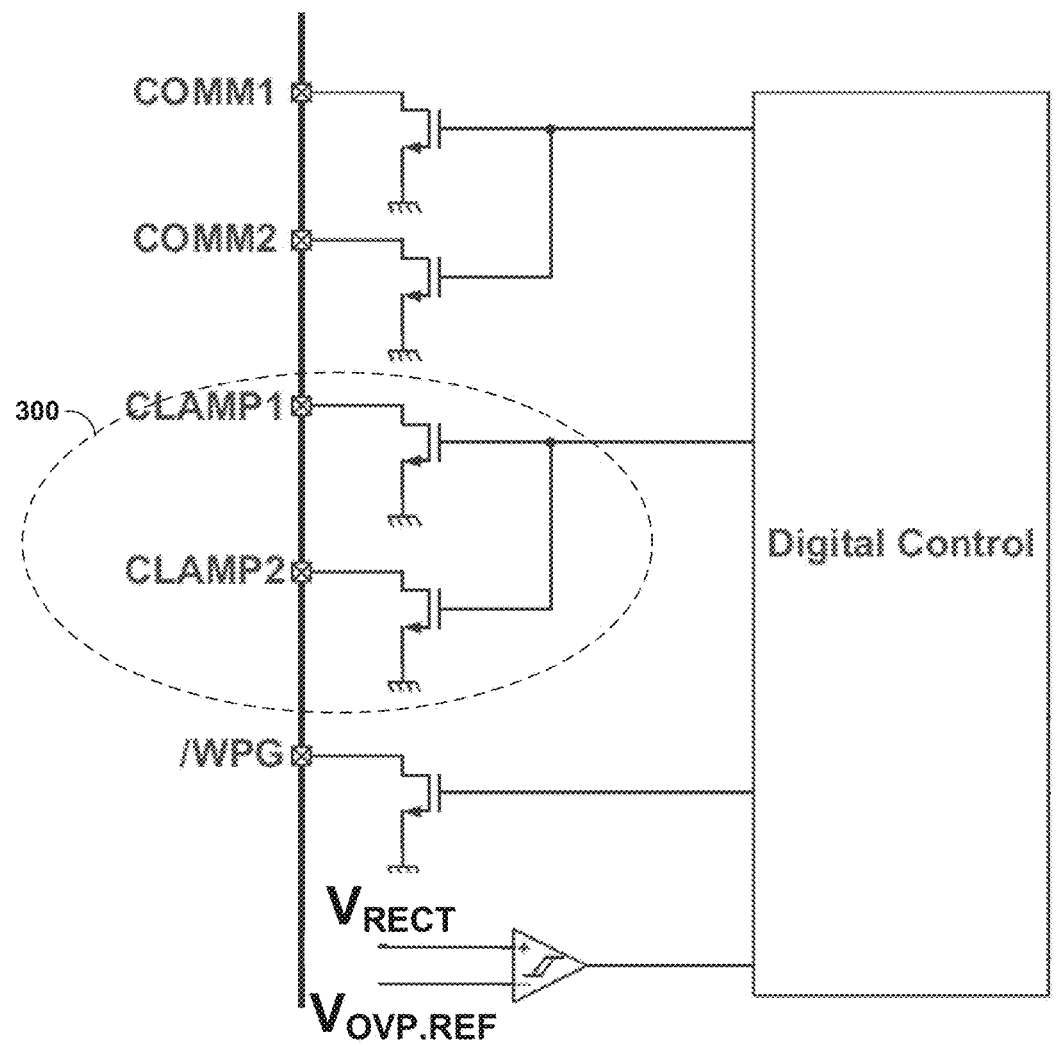

FIGS. 8A and 8B are circuit diagrams of an example wireless power receiver with a synchronous rectifier and voltage clamps for overvoltage protection. FIG. 8B shows a more detailed view of a portion of FIG. 8A. Dotted portion 300 highlights the similar features of the two circuit diagrams. FIGS. 8A and 8B are circuit diagram equivalents of power converter 4A of FIG. 2 and rely on expensive voltage clamps to protect the rectifier from overvoltage conditions.

Figure 9:
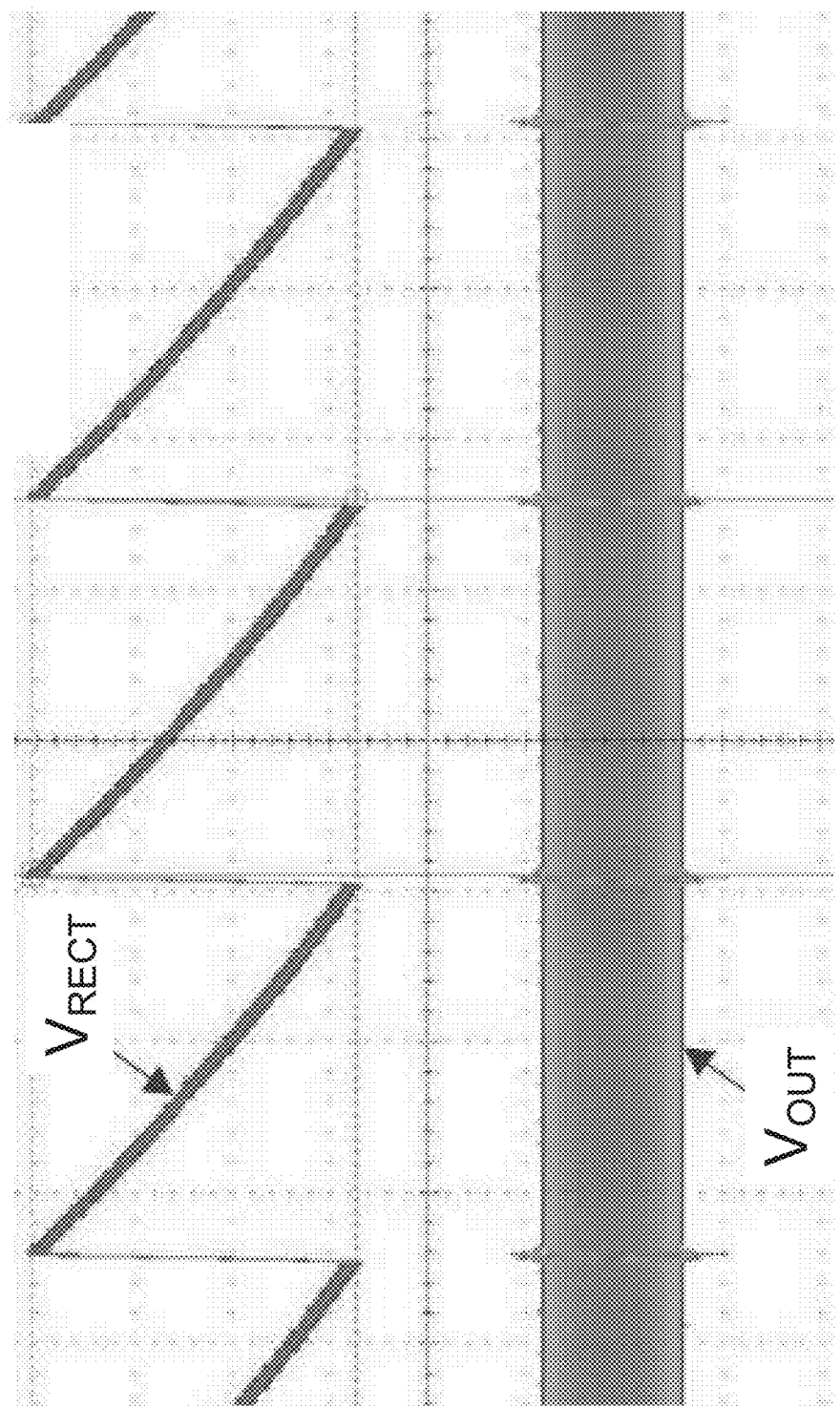
FIG. 9 is a timing diagram illustrating electrical timing characteristics the example power wireless power receiver of FIG. 8.

FIG. 9 is a timing diagram illustrating electrical timing characteristics the example power wireless power receiver of FIG. 8. When compared to the timing diagram of FIG. 6, FIG. 9 shows that the rectified voltage of a power converter that relies on expensive voltage clamps, such as those shown in FIG. 3, may have similar voltage and timing characteristics at the output of the rectifier, as a power converter that operates according to the techniques and circuits described herein. In other words, a power converter, such as power converter 4B, that operates according to the techniques and circuits described herein may be protected from overvoltage without relying on expensive voltage clamps and the like, and without degrading performance.

Clause 1. A circuit comprising: a rectifier configured to rectify a DC output from an AC input; a sensing unit configured to detect a voltage level of the DC output; a control unit configured to control the rectifier based on the voltage level of the DC output by at least controlling the rectifier to: rectify the DC output from the AC input if the voltage level of the DC output does not indicate an overvoltage condition at the circuit; and shunt current from the AC input if the voltage level of the DC output does indicate the overvoltage condition.

Clause 2. The circuit of clause 1, wherein the rectifier comprises at least one low-side element and at least one high-side element, wherein the control unit is configured to control the rectifier to shunt the current from the AC input if the voltage level of the DC output does indicate the overvoltage condition by at least enabling the at least one low-side element.

Clause 3. The circuit of clause 2, wherein the control unit is configured to control the rectifier to further shunt the current from the AC input if the voltage level of the DC output does indicate the overvoltage condition by at least disabling the at least one high-side element.

Clause 4. The circuit of any of clauses 2-3, wherein the control unit is configured to enable the at least one low-side element by at least performing hard switching of the at least one low-side element to maximize a rate at which the at least one low-side element shunts the current from the AC input.

Clause 5. The circuit of any of clauses 2-4, wherein the control unit is configured to enable the at least one low-side element by at least performing soft switching of the at least one low-side element to control a rate at which the at least one low-side element shunts the current from the AC input.

Clause 6. The circuit of any of clauses 2-5, wherein the at least one low-side element is a MOS transistor type switch.

Clause 7. The circuit of any of clauses 2-6, wherein the at least one high-side element is a MOS transistor type switch or a diode.

Clause 8. The circuit of any of clauses 2-7, wherein the at least one low-side element and the at least one high-side element are arranged in a half-bridge or a H-bridge configuration.

Clause 9. The circuit of any of clauses 2-8, wherein the rectifier comprises a plurality of low-side elements including the at least one low-side element, wherein the control unit is configured to enable the at least one low-side element by enabling the at least one low-side element without enabling at least one other low-side element of the plurality of low-side elements.

Clause 10. The circuit of any of clauses 2-9, wherein the rectifier comprises a plurality of low-side elements including the at least one low-side element, wherein the control unit is configured to enable the at least one low-side element by enabling each of the plurality of low-side elements.

Clause 11. The circuit of any of clauses 1-10, wherein the rectifier comprises at least one low-side element, at least one high-side element, and at least one switching element arranged in parallel to the at least one low-side element, wherein the control unit is configured to control the rectifier to shunt the current from the AC input if the voltage level of the DC output does indicate the overvoltage condition by at least enabling the at least one switching element without changing whether the at least one low-side element is enabled or disabled.

Clause 12. The circuit of any of clauses 1-12, wherein the rectifier comprises one or more switching elements, wherein each of the one or more switching elements of the rectifier comprises a respective body diode.

Clause 13. The circuit of any of clauses 1-13, wherein the control unit is further configured to: compare the voltage level of the DC output to a threshold voltage; and determine whether the voltage level of the DC output indicates the overvoltage condition at the circuit based on the comparison between the voltage level and the threshold voltage.

Clause 14. A method comprising: detecting a voltage level of a DC output from a rectifier that receives an AC input; determining, by a control unit, whether the voltage level indicates an overvoltage condition at the rectifier; rectifying, with the rectifier, the DC output if the voltage level of the DC output does not indicate the overvoltage condition; and shunting current from the AC input, with the rectifier, if the voltage level of the DC output does indicate the overvoltage condition.

Clause 15. The method of clause 14, wherein the rectifier comprises at least one low-side element and at least one high-side element, wherein shunting current from the AC input comprises enabling the at least one low-side element.

Clause 16. The method of clause 15, wherein shunting current from the AC input further comprises disabling the at least one high-side element Clause 17. The method of any of clauses 14-16, wherein enabling the at least one low-side element comprises hard switching, by the control unit, the at least one low-side element of the rectifier to maximize a rate at which the at least one low-side element shunts the current from the AC input.

Clause 18. The method of any of clauses 14-17, wherein enabling the at least one low-side element comprises soft switching, by the control unit, the at least one low-side element of the rectifier to control a rate at which the at least one low-side element shunts the current from the AC input.

Clause 19. The method of clause 14, further comprising: comparing, by the control unit, the voltage level of the DC output to a threshold voltage; and determining, by the control unit, whether the voltage level of the DC output indicates the overvoltage condition based on the comparison between the voltage level and the threshold voltage.

Clause 20. A circuit comprising: means for detecting a voltage level of a DC output from a rectifier that receives an AC input; means for determining whether the voltage level indicates an overvoltage condition at the rectifier; means for rectifying the DC output if the voltage level of the DC output does not indicate the overvoltage condition; and means for shunting current from the AC input if the voltage level of the DC output does indicate the overvoltage condition.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A circuit comprising:
  a rectifier comprising at least one high-side element and at least one low-side switch that are configured to rectify an AC input to a DC output, wherein:
    the at least one low-side switch is arranged in series between the AC input and a ground terminal of the circuit,
    the at least one high-side element is coupled, at the AC input, to the at least one low-side switch, and
    the at least one high-side element is arranged in series between the DC output and the AC input;
  a sensing unit configured to detect a voltage level of the DC output;
  a control unit configured to control the rectifier based on the voltage level of the DC output by at least controlling the at least one low-side switch of the rectifier to:
    rectify the AC input to the DC output if the voltage level of the DC output does not indicate an overvoltage condition at the circuit; and
    shunt current, from the AC input, through the at least one low-side switch, and to the ground terminal, if the voltage level of the DC output does indicate the overvoltage condition.

2. The circuit of claim 1, wherein the control unit is configured to control the rectifier to shunt the current, from the AC input, through the at least one low-side switch, and to the ground terminal, if the voltage level of the DC output does indicate the overvoltage condition, by at least switching-on the at least one low-side switch.

3. The circuit of claim 2, wherein the control unit is configured to control the rectifier to further shunt the current from the AC input if the voltage level of the DC output does indicate the overvoltage condition by at least disabling the at least one high-side element.

4. The circuit of claim 2, wherein the control unit is configured to switch-on the at least one low-side switch by at least performing hard switching of the at least one low-side switch to maximize a rate at which the at least one low-side switch shunts the current from the AC input.

5. The circuit of claim 2, wherein the control unit is configured to switch-on the at least one low-side switch by at least performing soft switching of the at least one low-side switch to control a rate at which the at least one low-side switch shunts the current from the AC input.

6. The circuit of claim 2, wherein the at least one low-side switch is a MOS transistor type switch.

7. The circuit of claim 2, wherein the at least one high-side element is a MOS transistor type switch or a diode.

8. The circuit of claim 2, wherein the at least one low-side switch and the at least one high-side element are arranged in a half-bridge or a H-bridge configuration.

9. The circuit of claim 2, wherein the rectifier comprises a plurality of low-side switches including the at least one low-side switch, wherein the control unit is configured to enable the at least one low-side switch by switching-on the at least one low-side switch without switching-on at least one other low-side switch of the plurality of low-side switches.

10. The circuit of claim 2, wherein the rectifier comprises a plurality of low-side switches including the at least one low-side switch, wherein the control unit is configured to switch-on the at least one low-side switch by switching-on each of the plurality of low-side switches.

11. The circuit of claim 1, wherein the rectifier further comprises at least one high-side element and at least one additional switching element arranged in parallel to the at least one low-side switch, wherein the control unit is configured to control the rectifier to shunt the current from the AC input if the voltage level of the DC output does indicate the overvoltage condition by enabling the at least one additional switching element.

12. The circuit of claim 1, wherein each of the one or more switches comprises a respective body diode.

13. The circuit of claim 1, wherein the control unit is further configured to:
  compare the voltage level of the DC output to a threshold voltage; and
  determine whether the voltage level of the DC output indicates the overvoltage condition at the circuit based on the comparison between the voltage level and the threshold voltage.

14. A method comprising:
  detecting a voltage level of a DC output from a rectifier that receives an AC input, the rectifier comprising at least one high-side element and at least one low-side switch that are configured to rectify the AC input to the DC output, wherein:
    the at least one low-side switch is arranged in series between the AC input and a ground terminal of the rectifier,
    the at least one high-side element is coupled, at the AC input, to the at least one low-side switch, and
    the at least one high-side element is arranged in series between the DC output and the AC input;
  determining, by a control unit, whether the voltage level indicates an overvoltage condition at the rectifier;
  controlling, by the control unit, the at least one low-side switch of the rectifier to rectify the AC input to the DC output if the voltage level of the DC output does not indicate the overvoltage condition; and
  controlling, by the control unit, the at least one low-side switch of the rectifier to shunt, current, from the AC input, through the at least one low-side switch, and to the ground terminal, if the voltage level of the DC output does indicate the overvoltage condition.

15. The method of claim 14, wherein controlling the at least one low-side switch of the rectifier to shunt current from the AC input, through the at least one low-side switch, and to the ground terminal, comprises switching-on the at least one low-side switch.

16. The method of claim 15, wherein controlling the at least one low-side switch of the rectifier to shunt current from the AC input further comprises disabling the at least one high-side element.

17. The method of claim 15, wherein switching-on the at least one low-side switch comprises hard switching, by the control unit, the at least one low-side switch of the rectifier to maximize a rate at which the at least one low-side switch shunts the current from the AC input.

18. The method of claim 15, wherein switching-on the at least one low-side switch comprises soft switching, by the control unit, the at least one low-side switch of the rectifier to control a rate at which the at least one low-side switch shunts the current from the AC input.

19. The method of claim 14, further comprising:
  comparing, by the control unit, the voltage level of the DC output to a threshold voltage; and
  determining, by the control unit, whether the voltage level of the DC output indicates the overvoltage condition based on the comparison between the voltage level and the threshold voltage.

20. A circuit comprising:
  means for detecting a voltage level of a DC output from a rectifier that receives an AC input, the rectifier comprising at least one high-side element and at least one low-side switch that are configured to rectify the AC input to the DC output, wherein:
    the at least one low-side switch is arranged in series between the AC input and a ground terminal of the rectifier,
    the at least one high-side element is coupled, at the AC input, to the at least one low-side switch, and
    the at least one high-side element is arranged in series between the DC output and the AC input;
  means for determining whether the voltage level indicates an overvoltage condition at the rectifier;
  means for controlling the at least one low-side switch of the rectifier to rectify the AC input to the DC output if the voltage level of the DC output does not indicate the overvoltage condition; and
  means for controlling the at least one low-side switch of the rectifier to shunt current, from the AC input, through the at least one low-side switch, and to the ground terminal, if the voltage level of the DC output does indicate the overvoltage condition.

* * * * *